United States Patent
Sperry et al.

(10) Patent No.: US 6,283,174 B1
(45) Date of Patent: Sep. 4, 2001

(54) CLEANING MECHANISM FOR FLUID DISPENSER

(75) Inventors: Laurence Sperry, Brighten; Steven Hickey, Somerville; Eric Kane, Lynn; Jesse Drake, Maynard, all of MA (US)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 09/626,993

(22) Filed: Jul. 27, 2000

(51) Int. Cl.$^7$ ........................................................ B65B 1/04
(52) U.S. Cl. ............................. 141/85; 141/114; 141/313; 141/311 A; 383/105
(58) Field of Search .................................. 141/85, 89, 90, 141/114, 311 A, 313–317, 166, 10; 383/105, 32; 239/106

(56) References Cited

U.S. PATENT DOCUMENTS

| | | |
|---|---|---|
| 3,687,370 | 8/1972 | Sperry ................................ 239/112 |
| 3,945,569 | 3/1976 | Sperry ................................ 239/112 |
| 4,426,023 | 1/1984 | Sperry et al. ....................... 222/132 |
| 4,674,268 | 6/1987 | Gavronsky et al. ................. 53/468 |
| 4,800,708 | 1/1989 | Sperry ................................ 53/449 |
| 4,854,109 | 8/1989 | Pinarer et al. ..................... 53/397 |
| 4,898,327 | 2/1990 | Serry et al. ........................ 239/1 |
| 5,027,583 | 7/1991 | Chelak .............................. 53/451 |
| 5,255,847 | 10/1993 | Sperry et al. ..................... 239/112 |
| 5,335,483 | 8/1994 | Gavronsky et al. ............... 53/451 |
| 5,376,219 | 12/1994 | Sperry et al. ..................... 156/515 |
| 5,727,370 | 3/1998 | Sperry .............................. 53/472 |
| 5,776,510 | 7/1998 | Reichental et al. ............... 425/112 |
| 5,993,962 | 11/1999 | Timm et al. ...................... 428/354 |
| 6,003,288 | 12/1999 | Sperry et al. ..................... 53/552 |

*Primary Examiner*—Steven O. Douglas
(74) *Attorney, Agent, or Firm*—Thomas C. Lagaly

(57) ABSTRACT

An apparatus, system, and method for dispensing fluid into containers includes a cleaning mechanism that brings the discharge nozzle of a dispenser into the travel path of a film web so that the end-face can make contact with the film web to remove from the end-face at least a portion of any fluid or reaction-products of the fluid that may be in adherence with the end-face. A film for removing such fluid or reaction-products from the end-face of the dispenser is also provided.

35 Claims, 6 Drawing Sheets

CLEANING MECHANISM FOR FLUID DISPENSER

BACKGROUND OF THE INVENTION

The present invention relates to an apparatus, system, and method for dispensing fluids into containers and, more particularly, to an improved mechanism for cleaning fluid dispensers associated with such apparatus, system, and method. The invention also relates to a film from which the containers can be made and which also facilitates the cleaning of the dispensers.

The invention finds particularly utility in the field of foam-in-place packaging, which is a highly useful technique for on-demand protection of packaged objects. In its most basic form, foam-in-place packaging comprises injecting foamable compositions from a dispenser into a container that holds an object to be cushioned. Typically, the object is wrapped in plastic to keep it from direct contact with the rising (expanding) foam. As the foam rises, it expands into the remaining space between the object and its container (e.g. a corrugated board box) thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated device produces flexible bags from flexible, plastic film and dispenses a foamable composition into the bags as the bags are being formed. As the composition expands into a foam within the bag, the bag is sealed shut and typically dropped into a container holding the object to be cushioned. The rising foam again tends to expand into the available space, but does so inside the bag. Because the bags are formed of flexible plastic, they form individual custom foam cushions around the packaged objects. Exemplary devices are assigned to the assignee of the present invention, and are illustrated, for example, in U.S. Pat. Nos. 4,800,708, 4,854,109, 5,376,219, and 6,003,288, the contents of each of which are incorporated entirely herein by reference.

One problem with the foamable compositions used to make polyurethane foam for foam-in-place packaging is that the foam precursors and resultant foam tend to have somewhat adhesive properties. As a result, the foamable composition tends to stick to objects that it strikes and then hardens into foam. One location where this causes a particular problem is the discharge nozzle of the dispenser from which the foam precursors are ejected. As is known, the polyol and isocyanate foam precursors must be withheld from mixing with one another until just prior to injection. In the most common type of dispenser, the two foam precursors enter the dispenser, mix with one another, and then exit the dispenser via the discharge nozzle as the foamable composition. As the dispenser operates over and over again, particularly in automated or successive fashion, foamable composition tends to build up around the discharge port of the dispenser, harden into foam, and block the proper exiting of further foamable composition. As a result, the discharge nozzle and discharge port must be frequently cleaned to ensure continued operation of the dispenser.

A number of cleaning solutions have been proposed. One such solution employs a solvent that is capable of dissolving the foamable composition. Such solvent is continually pumped into the dispenser and through the discharge port to carry away any residual foamable composition remaining on or around the discharge port. While this solution has proven to be somewhat effective, the discharge port nevertheless eventually becomes occluded with foam, requiring the dispenser to be disassembled and cleaned. Furthermore, the solvent adds to the expense and complexity of the foam-in-place packaging machinery.

Another solution is to employ a solvent-soaked pad on which to wipe the face of the discharge nozzle in order to remove residual foamable composition therefrom, e.g., as disclosed in U.S. Pat. No. 4,674,268. While this solution has also been shown to be somewhat effective, it entails a rather complex mechanized system for moving the dispenser into contact with the wiping pad, thereby adding expense, complication, and potential for mechanical problems to the foam-in-place system in which it is incorporated. Additionally, the wiping pad frequently becomes fouled with the precursors and foam, necessitating continuous monitoring and replacement of the pad. As can be appreciated, such limitations are not conducive to an automated foam-in-place packaging process.

A further solution to the problem of dispenser cleaning is the use of two discharge nozzles to dispense separately the polyol and isocyanate foam precursors into a bag, wherein the two precursors are mixed. Although this arrangement avoids the mixing of the two precursors in a single dispenser, and therefore also avoids the formation of foam on and around the discharge port of the dispensers, the need to periodically clean the discharge nozzles remains. This is particularly true for the nozzle used to dispense the isocyanate precursor because the isocyanate reacts with moisture in the air to crystallize at the discharge port of the nozzle. Thus, some method for cleaning such a dual nozzle dispenser must still be employed.

Accordingly, a need exists in the art for an improved means for automatically cleaning dispensers used in foam-in-place packaging.

SUMMARY OF THE INVENTION

That need is met by the present invention, which, in one aspect, provides an apparatus for dispensing fluid into containers, comprising:

a. a mechanism that conveys a web of film along a predetermined path of travel and converts the film into one or more containers;

b. a dispenser through which fluid may flow in predetermined amounts, the dispenser positioned adjacent the travel path of the film web such that the dispenser is capable of dispensing fluid into the containers, the dispenser having a discharge nozzle comprising an end-face and a discharge port disposed in the end-face, wherein fluid exits the dispenser through the discharge port; and c. a cleaning mechanism that brings the discharge nozzle of the dispenser into the travel path of the film web so that the end-face can make contact with the film web to remove from the end-face at least a portion of any fluid or reaction-products of the fluid that may be in adherence with the end-face.

Another aspect of the present invention is a system for dispensing fluid into containers, comprising:
  a. a web of film;
  b. a mechanism that conveys the film web along a predetermined path of travel and converts the film web into one or more containers;
  c. a fluid source containing therein a fluid;
  d. a dispenser in fluid communication with the fluid source and being positioned adjacent the travel path of the film web to dispense a predetermined amount of the fluid into the containers, the dispenser having a discharge nozzle through which the fluid flows into the containers, the discharge nozzle comprising an end-face and a discharge port disposed in the end-face, the fluid exiting the dispenser through the discharge port; and
  e. a cleaning mechanism that brings the discharge nozzle of the dispenser into the travel path of the film web so that the end-face makes contact with the film web to remove from the end-face at least a portion of any fluid or reaction-products of the fluid that may be in adherence with the end-face.

A further aspect of the present invention is a method for dispensing fluid into containers, comprising:
  a. providing a web of film;
  b. conveying the film web along a predetermined path of travel and converting the film web into one or more containers;
  c. providing a fluid source containing therein a fluid;
  d. dispensing a predetermined amount of the fluid into the containers from a dispenser that is in fluid communication with the fluid source and is positioned adjacent the travel path of the film web, the dispenser having a discharge nozzle through which the fluid flows into the containers, the discharge nozzle comprising an end-face and a discharge port disposed in the end-face, the fluid exiting the dispenser through the discharge port; and
  e. removing from the end-face at least a portion of any fluid or reaction-products of the fluid that may be in adherence with the end-face by bringing the discharge nozzle of the dispenser into the travel path of the film web so that the end-face makes contact with the film web.

An additional aspect of the present invention is a film web that is conveyable along a predetermined path of travel, convertible into one or more containers, and capable of enclosing within the containers a polyurethane foam that forms within the containers as the reaction-product of two or more foam precursors, the precursors being dispensed into the containers separately or as a mixture by at least one dispenser having a discharge nozzle through which the precursors flow into the containers, the discharge nozzle comprising an end-face and a discharge port disposed in the end-face, the film web comprising one or more materials incorporated into the film web or adhered to a surface of the film web such that, when the film web is brought into contact with the endface, at least a portion of any precursors or reaction-products thereof that may be in adherence with the end-face are removed therefrom.

Accordingly, the present invention provides a means for automatically cleaning the end-face of a dispenser used in an automated 'form-fill-seal' packaging apparatus without the need for extra materials, such as a cleaning solvent.

DETAILED DESCRIPTION OF THE INVENTION

Figure 1:
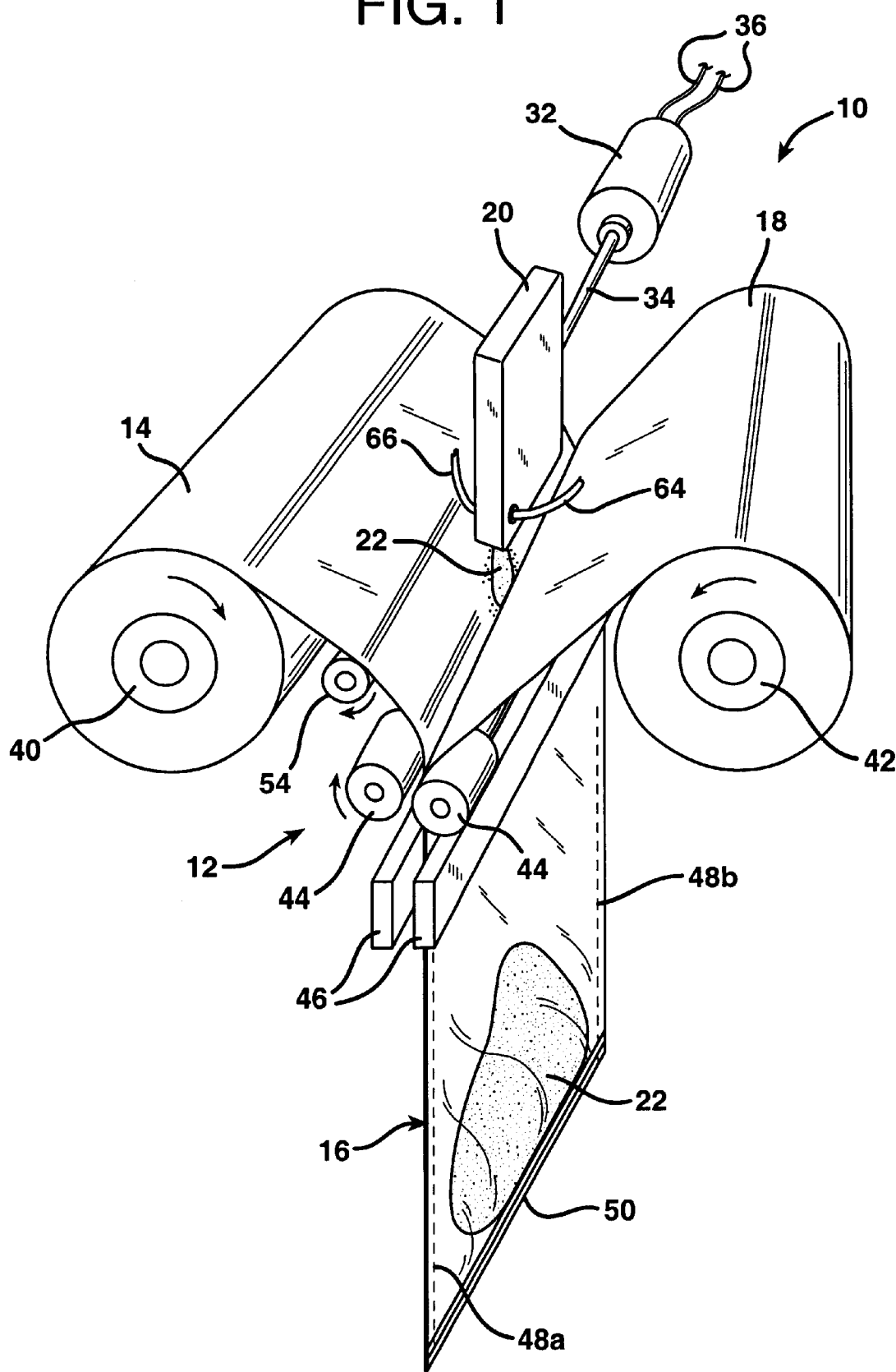
FIG. 1 is a perspective view of an apparatus and system in accordance with the present invention in which a bag is formed from a pair of flexible films and a foamable composition or other fluid is introduced into the bag via a dispenser as the bag is formed.

FIG. 1 illustrates an apparatus 10 in accordance with the present invention for dispensing fluid into containers. The apparatus 10 comprises a mechanism generally indicated at 12 that conveys a web of film 14 along a predetermined path of travel and converts the film into one or more containers 16. In the embodiment presently illustrated, apparatus 10 is adapted to form container 16 from two film webs, namely, film web 14 as noted above and also film web 18, as will be explained in further detail below. The film webs may comprise any flexible materials that can be manipulated by apparatus 10, such as, e.g., various thermoplastic or fibrous materials such as polyethylene or paper.

As referenced herein, the "travel path" of film web 14 and of film web 18 is the route that each film web, which are generally two-dimensional, traverses while being conveyed through the apparatus 10, as indicated by the shape assumed by both film webs due to the manipulation thereof by apparatus 10.

Figure 2:
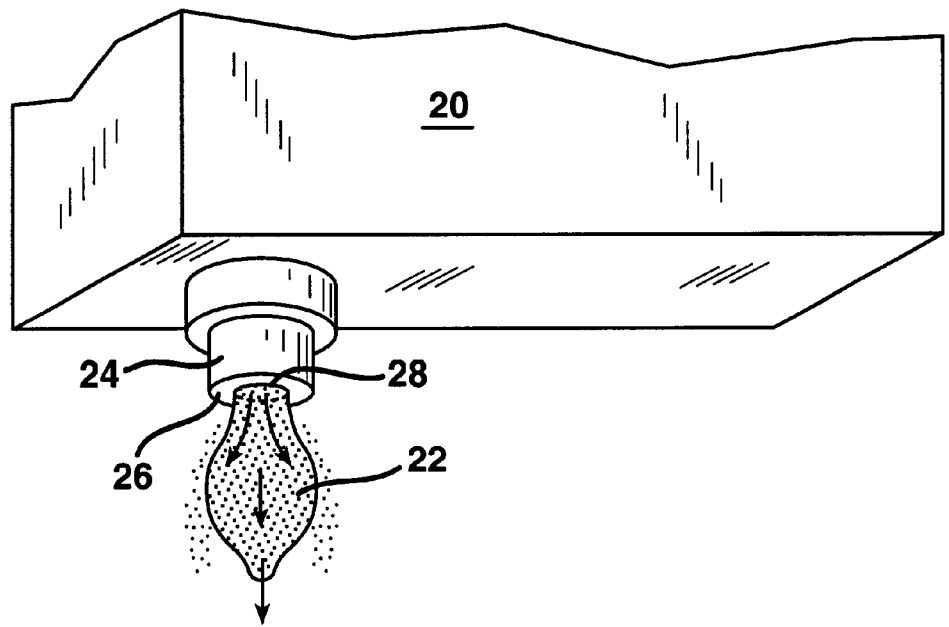
FIG. 2 is a perspective view of the discharge nozzle of the dispenser as a foamable composition flows therethrough as shown in FIG. 1.

Apparatus 10 further includes a dispenser 20 through which a fluid 22 may flow in predetermined amounts. Dispenser 20 is positioned adjacent the travel path of film web 14, and also that of film web 18, such that the dispenser is capable of dispensing fluid 22 into container 16 (as well as other containers subsequently made thereafter). As shown in FIG. 2, dispenser 20 has a discharge nozzle 24 comprising an end-face 26 and discharge port 28 disposed in the end-face 26. Fluid 22 exits dispenser 20 through discharge port 28 as shown.

In accordance with the present invention, apparatus 10 includes a leaning mechanism that brings the discharge nozzle 24 of dispenser 20 into the travel path of the film web (or one of the film webs in the case where two films webs are employed as shown) so that the end-face 26 can make contact with the film web to remove from the end-face 26 at least a portion of any fluid or reaction-products of the fluid that may be in adherence with end-face 26.

Figure 3:
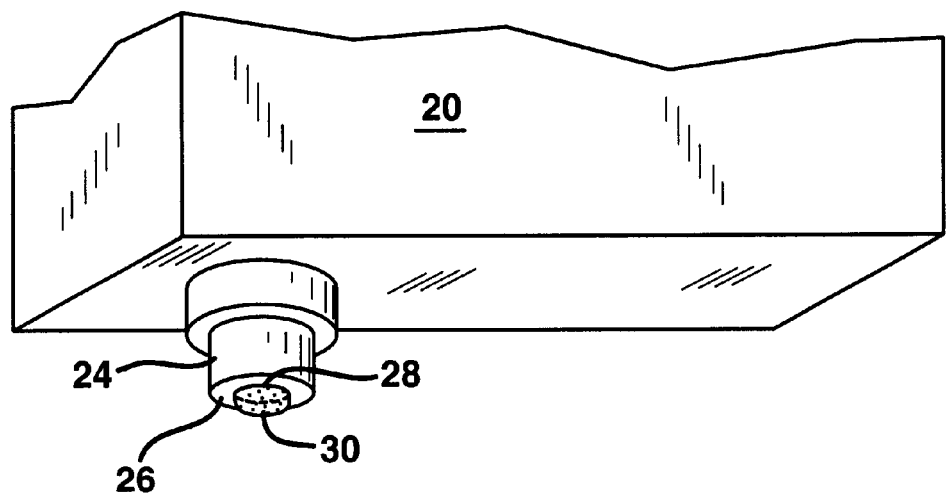
FIG. 3 is a perspective view of the discharge nozzle shown in FIG. 2 after the dispenser has ceased dispensing foam, wherein a residual amount of the foamable composition remains adhered to the end-face and discharge port of the nozzle.

As shown in FIG. 3, after dispenser 20 has ceased dispensing fluid 22 into container 16, e.g., while conveying and converting apparatus 12 begins to form another container from film webs 14 and 18, a portion of the fluid 22 or reaction products thereof may remain in adherence with end-face 26 of the discharge nozzle 24 on or around the discharge port 28. For convenience and clarity, such fluid or reaction products thereof remaining in adherence with end-face 26 after dispenser 20 ceases dispensing fluid shall be referred to as "residual" fluid 30, as shown in FIG. 3. Such residual fluid can impede or prevent subsequent dispensation of fluid through dispenser 20, e.g., when the residual fluid 30 hardens or becomes more viscous and thereby occludes the discharge port 28. This can occur when a portion of the fluid evaporates or when the fluid contains a component that reacts with the air or with a component in the air and hardens through crystallization, e.g., many isocyanate compounds react with moisture in the air to form a relatively hard crystalline structure. Hardening of residual fluid 30 may also occur when the fluid contains a mixture of two or more components that react with one another form a hardened reaction-product such as a mixture of a polyol and an isocyanate that react to form polyurethane foam.

Thus, "fluid," "residual fluid," and "reaction products" thereof that may be removed from end-face 26 of dispenser 20 in accordance the present invention include any fluid that is dispensed from dispenser 20, whether the dispensed fluid is still in the fluid state or whether it is in a partial or complete solid state, e.g., where a fluid has become solid or partially solid through evaporation, where a polyol/isocyanate mixture has partially or fully hardened into a foam, or where an isocyanate compound has partially or fully crystallized.

Figure 4:
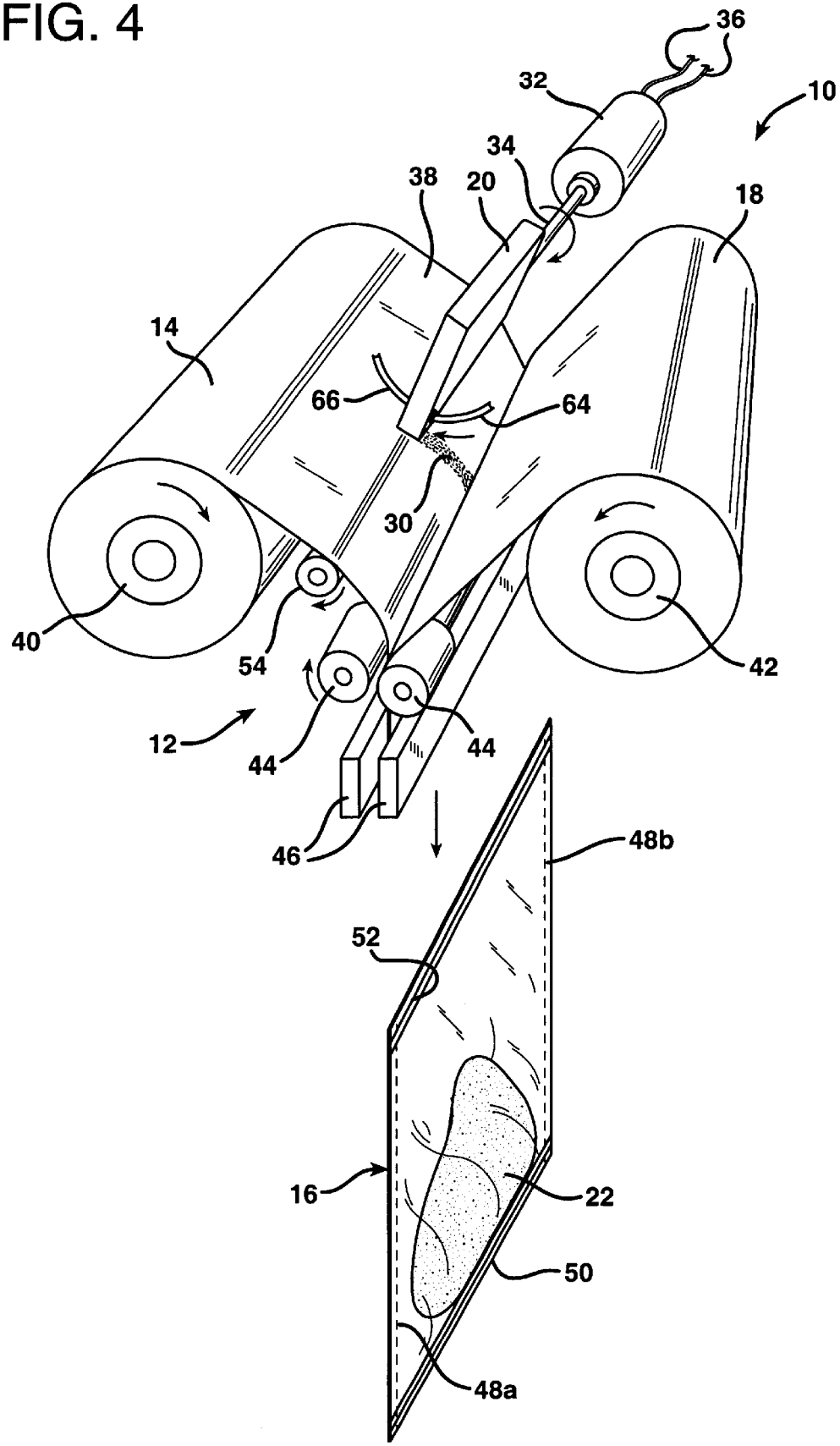
FIG. 4 is a perspective view of the foam-in-bag apparatus and system as shown in FIG. 1, except that the bag has been sealed closed and severed from the film webs and the dispenser has assumed a cleaning mode in which the dispenser has been rotated so that the end-face of the dispenser's discharge nozzle contacts one of the films to remove at least some of the residual foamable composition from the end-face.
Figure 5:
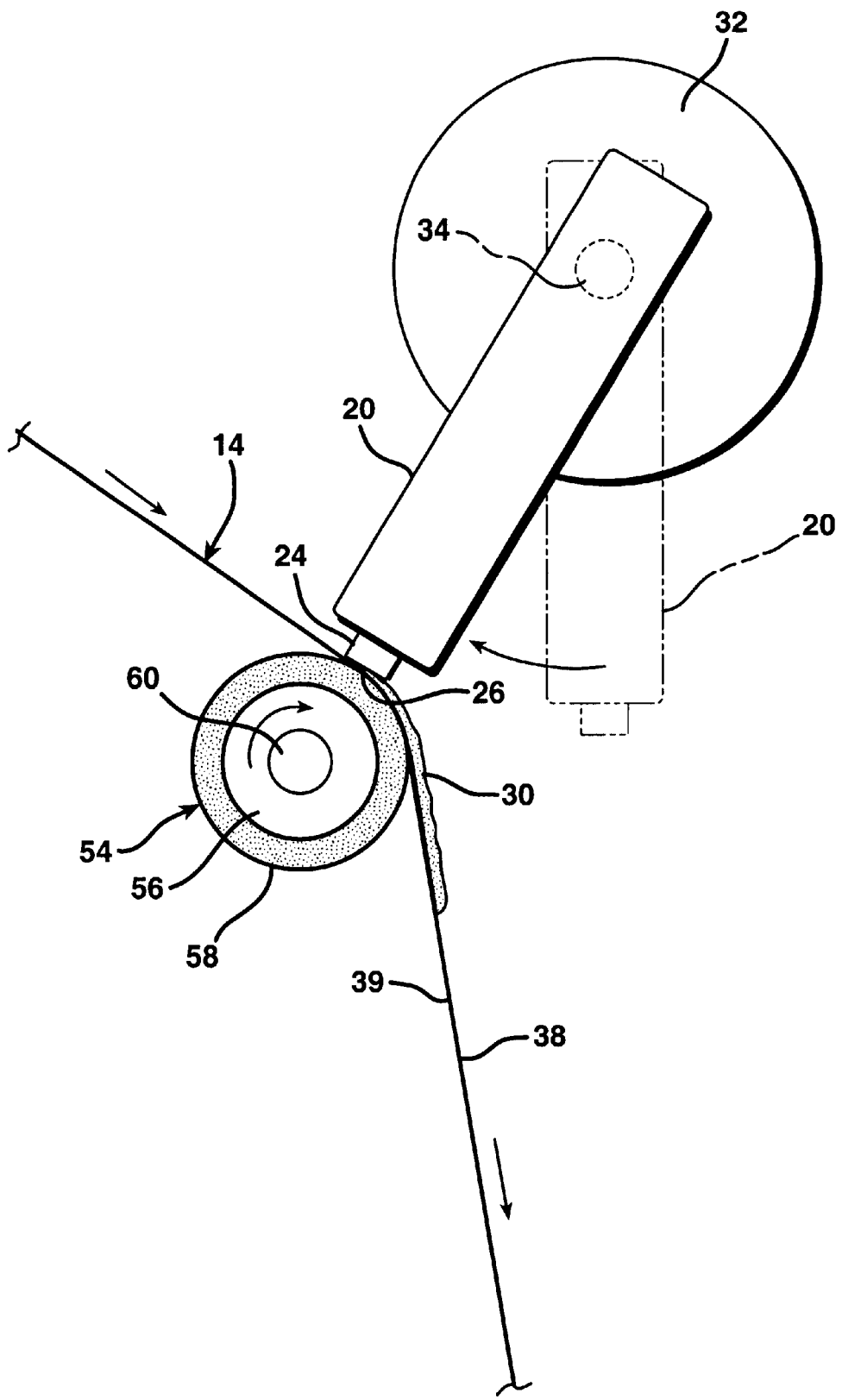
FIG. 5 is a detailed, elevational view of the dispenser as shown in FIG. 4, as the end-face of the discharge nozzle is pressed against the film which, in turn, is supported by a support roll to facilitate removal of the residual foamable composition from the end-face of the dispenser.

A cleaning mechanism in accordance with the present invention prevents, or at least reduces that rate of, occlusion of the discharge port 28 by removing from the end-face 26 at least a portion of the residual fluid 30 before such fluid substantially hardens or increases in viscosity. As noted above, this is accomplished by bringing the end-face 26 of discharge nozzle 24 into contact with one of the film webs 14 or 18. In one embodiment of the invention, such a cleaning mechanism comprises an actuator 32 and drive rod 34 to which dispenser 20 is distally mounted as shown in FIGS. 1, 4, and 5. Actuator 32 is any device capable of causing drive rod 32, and thereby dispenser 20, to rotate about the longitudinal axis of the drive rod. Suitable devices that may be used for actuator 32 include various motors that may be operated by hydraulic, pneumatic, or electric power as supplied through power supply lines 36. An electric motor is preferred for most applications.

Apparatus 10 may assume a 'dispensing mode' as shown in FIG. 1 and a 'cleaning mode' as shown in FIG. 4. While in the dispensing mode, actuator 32 and drive rod 34 hold dispenser 20 in a first, 'dispensing position' as shown in FIG. 1, in which the end-face 26 of the discharge nozzle 24 is adjacent the film webs 14, 18 such that the dispenser 20 can dispense fluid 22 into container 16, i.e., with the discharge nozzle 24 of the dispenser directed at the open, unsealed top of the container. When a sufficient amount of fluid has been dispensed into container 16, the container is sealed closed and severed from the film webs 14 and 18 (this operation is described more fully below). Actuator 32 then causes dispenser 20 to move by rotation to a second, 'cleaning position' as shown in FIG. 4, in which the end-face 26 of the dispenser is in contact with film web 14 (see also FIG. 5). While in the cleaning position, any residual fluid 30 that may be in adherence with the end-face 26 is at least partially transferred to the surface 38 of film web 14 with which end-face 26 is in contact. This may be accomplished, e.g., by moving the discharge nozzle 24 one or more times against the film web surface 38 so that the end-face 26 is 'wiped' against the film web surface. The transfer of fluid to film web 14 may be a permanent transfer, as where the fluid adheres to the film web as shown, or a temporary transfer, as where the fluid evaporates from the film web or does not adhere to the film but becomes disengaged from the film at some point after removing the fluid or reaction-products thereof from the end-face of the dispenser.

In certain applications, it may be desirable to maintain dispenser 20 in the cleaning position as shown in FIG. 4 while apparatus 10 is idle, i.e., temporarily not making containers and dispensing fluid therein, so that, during such idle periods, end-face 26 and discharge port 28 remain in contact with film web surface 38. This serves to minimize or prevent the contamination, evaporation, or crystallization of fluid 22 in dispenser 20, e.g., by reducing the exposure of such fluid to air when the apparatus is idle. This may be particularly beneficial when fluid 22 is or contains an isocyanate, which crystallizes upon exposure to moisture in the air.

For reasons which will become apparent, prior to describing further features and alternatives of the cleaning mechanism in accordance with the present invention, the conveying and converting apparatus 12 will be described in further detail. As shown in FIGS. 1 and 4, conveying and converting apparatus 12 includes a pair of storage rolls 40, 42, nip rolls 44, and a severing and sealing mechanism 46. Film webs 14 and 18 are supported on and unwound from respective storage rolls 40, 42 for conversion into containers, e.g., container 16 as shown. Nip rolls 44 rotate in opposing directions such that, when the films webs 14, 18 are passed therebetween, the rotation of the nip rolls cause the film webs to advance from storage rolls 40, 42. The nip rolls are made to rotate in this manner by being mechanically or otherwise coupled to a suitable power source (not shown), e.g., an electric motor.

Nip rolls 44 preferably also produce longitudinal seals 48a and 48b on container 16. This may be accomplished via the application of sufficient heat by the nip rolls 44 to the film webs to cause the longitudinal edges thereof to fuse together. Such a process is well known, e.g., as described in the above-incorporated patents. Alternatively, one or both of film webs 14, 18 may include strips of a bonding material at the longitudinal edges of the film webs, e.g., an adhesive or cohesive material, that form the longitudinal seals 48a,b when the film webs are pressed together by the nip rolls 44. This latter process is described in copending U.S. Ser. No. 09/591,830, filed Jun. 12, 2000 and entitled METHOD FOR ENCLOSING A FOAMABLE COMPOSITION IN A FLEXIBLE BAG (Oberle et al.), the disclosure of which is hereby incorporated herein by reference.

Severing and sealing mechanism 46 forms transverse bottom and top seals 50 and 52, respectively, preferably by the application of sufficient heat to cause the films to fuse together across the entire width of the film webs. In a process that is also well described in the above-incorporated patents, transverse bottom seal 50 is first formed then, as the film webs 14, 18 are advanced by nip rolls 44 (and also longitudinal seals 48a,b formed thereby), dispenser 20 dispenses fluid 22 into the resultant container 16 as the container is being formed. When a sufficient, predetermined amount of fluid 22 has been added to the container and a sufficient amount (length) of the film webs 14, 18 have been withdrawn from storage rolls 40, 42 to achieve a desired longitudinal length of container 16, severing and sealing mechanism 46 forms top transverse seal 52 (FIG. 4) to thereby seal the container 16 closed with fluid 22 enclosed therein. Simultaneous with or just after the formation of top transverse seal 52, severing/sealing mechanism 46 severs the completed container 16 from film webs 14, 18, preferably by the application of sufficient heat to the films webs to melt completely through them such that the completed container 16 drops downwards by force of gravity from apparatus 10.

Figure 6:
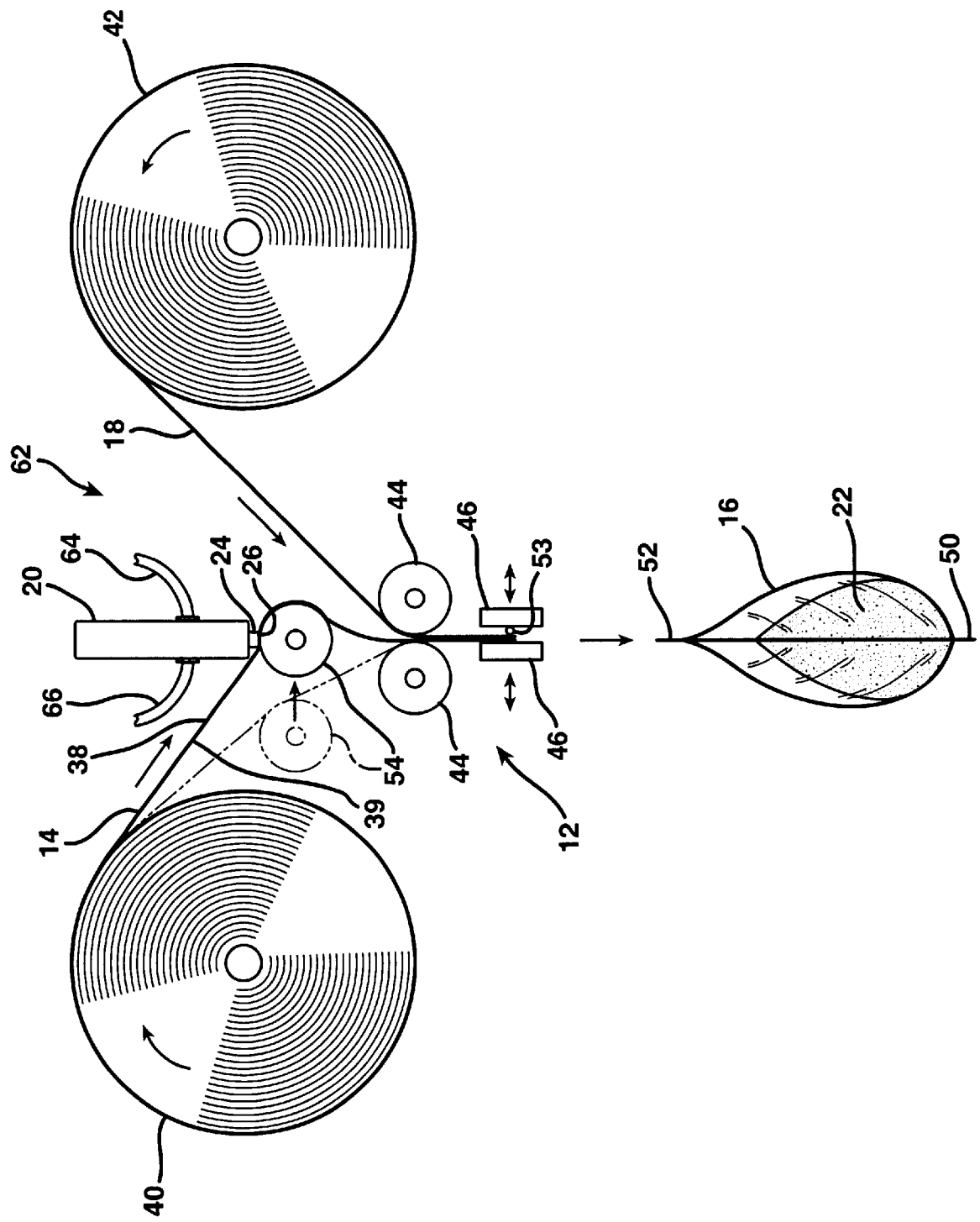
FIG. 6 is a schematic, elevational view of an alternative embodiment of the invention in which the support roll is translated towards the stationary dispenser in order to bring the film into contact with the dispenser end-face to remove residual foamable composition therefrom.

As illustrated most clearly in FIG. 6, the severing and sealing mechanism 46 may include at least one wire 53 or other electrical resistance device that can be heated sufficiently to melt through both of film webs 14 and 18 when the wire is pressed into contact with the films, which can be done by causing both halves of the mechanism 46 to converge on the films and squeeze the films therebetween as shown. As this occurs, a current is sent through wire 53, causing it to heat and melt through film webs 14, 18, thereby severing a completed container 16 from the film webs. At the same time, the heat from wire 53 causes the films to weld together both below and above the wire; the weld below the wire forms the transverse top seal 52 of the completed container 16 and the weld above the wire forms a transverse bottom seal as at 50 for the next container to be formed from film webs 14, 18.

Other techniques for forming transverse seals are possible, such as, e.g., employing two or more wires on one or both halves of the mechanism 46, with each wire performing a separate sealing or severing function.

Referring now to FIGS. 4 and 5, a preferred feature of the cleaning mechanism in accordance with the present invention will be described. Preferably, the conveying and converting mechanism 12 is adapted to advance the film webs 14, 18 along their path of travel when the end-face 26 of discharge nozzle 24 is in contact with film web 14, thereby facilitating the removal of residual fluid 30 (or reaction-products thereof) from the end-face. This may be accomplished when actuator 32 holds dispenser 20 in the cleaning position as shown, and then conveying/converting mechanism 12 causes film web 14 (and web 18) to advance such that residual fluid 30 is 'wiped' from the end-face 26, as indicated by the smear of the residual fluid 30 trailing from dispenser 20 on surface 38 of film web 14. (The thickness and amount of the residual fluid 30 shown to be transferred to film web 14 has been exaggerated for clarity.) This residual fluid thus transferred to film web 14 may be simply incorporated into the next container to be formed, i.e., on the inner surface thereof, so that the cleaning (wiping) process wastes no film.

Apparatus 10 preferably includes, as a further component of the cleaning mechanism, a support element 54. As shown, the support element 54 has a position relative to dispenser 20 such that the travel path of film web 14 passes between the support element and the dispenser, i.e., dispenser 20 and support element 54 are positioned adjacent opposing surfaces of film web 14, with dispenser 20 adjacent surface 38 of film web 14 and support element 54 adjacent opposing surface 39 of the film web (see FIG. 5). In this manner, when apparatus 10 is in the cleaning mode as depicted in FIGS. 4 and 5, the discharge nozzle 24 of dispenser 20 presses film web 14 against support element 54. That is, when the end-face 26 of the discharge nozzle is pressed into contact with surface 38 of film web 14, the support element 54 provides an opposing force so that an intimate contact between the end-face 26 and film surface 38 can be achieved.

Support element 54 is preferably cylindrical in shape. As shown most clearly in FIG. 5, the support element may include a core 56, which is suitably mounted to apparatus 10 (mounting means not shown), and an outer sleeve 58, such sleeve making contact with surface 39 of film web 14. Sleeve 58 is preferably formed from a pliable material, such as a polyurethane, polyolefin, or polystyrene foam, e.g., a polyurethane foam having a density ranging from about 2 to about 8 pounds/ft$^3$, such as about 4 pounds/ft$^3$. Another suitable pliable material for sleeve 58 is a radial brush, e.g., a radial brush having an array of bristles comprising polyurethane or polypropylene and ranging in diameter from about 8 to about 15 mils. Alternatively, the sleeve may be formed from a less pliable material, such as a synthetic rubber, or a hard material such as metal. The sleeve may have a rough, e.g., embossed, or smooth surface as desired.

Support element 54 is preferably rotatable on axis 60 such that the support element is caused to rotate in the direction shown when nip rolls 44 advance film web 14. Alternatively, the support element may be stationary, i.e., non-rotatable such that film web 14 slides over the surface of sleeve 58, or driven in the opposite direction shown in FIG. 5, i.e., against the direction in which the film moves.

It will be appreciated that many alternatives for support element 54 are possible, depending upon the particular application in which apparatus 10 is employed. For instance, the support element may have a flat or oval cross-sectional shape instead of the round cross-sectional shape depicted; may be caused to translate, vibrate, or remain stationary instead of rotating as shown; and have any desired surface characteristics ranging, e.g., from rough to smooth and from pliable to hard.

As shown in FIG. 5, when support member 54 has a round cross-section, the end-face 26 of discharge nozzle 24 is substantially tangential to film web 14 when the end-face is in contact with the film web, i.e., when dispenser 20 is in the cleaning mode as shown. Alternatively, if no support member is present, if the support member has a flattened or ovalized cross-section, or if the sleeve 58 is a highly pliant material, the end-face 26 will be generally co-planar with the film web while in the cleaning position.

As an alternative to the above-described cleaning mechanism in which dispenser 20 moves from the dispensing position shown in FIG. 1 to the cleaning position shown in FIGS. 4 and 5, the dispenser may remain stationary while a device moves the travel path of one of the film webs between a first, dispensing position and a second, cleaning position. Such an alternative apparatus 62 is illustrated in FIG. 6, and includes the same components as apparatus 10 as illustrated in FIGS. 1–5, except that the support element 54 is employed as a device to move the travel path of film web 14 between dispensing and cleaning positions while dispenser 20 remains in a fixed position as shown.

Specifically, support element 54 is adapted to move the travel path of film web 14 from a first, dispensing position (shown in phantom), in which the end-face 26 of discharge nozzle 24 is adjacent film web 14 such that dispenser 20 can dispense fluid into the containers that are formed, to a second, cleaning position, in which surface 38 of film web 14 is in contact with end-face 26. While in the dispensing position, apparatus 62 has the same configuration and operates identically to apparatus 10 as shown in FIG. 1. When apparatus 62 switches to the cleaning mode as shown in FIG. 6, i.e., after container 16 has been filled with a desired amount of fluid 22 and severed from film webs 14, 18, support member 54 translates towards discharge nozzle 24 of dispenser 20 as shown and, in so doing, moves the travel path of film web 14 so that upper surface 38 is brought into contact with end-face 26 of the discharge nozzle. Film web 14 thus removes from end-face 26 any residual fluid (not shown in FIG. 6) or reaction products thereof remaining on the end-face in the same manner as described above in relation to apparatus 10, i.e., the cleaning mechanism in apparatus 10 and the alternative cleaning mechanism in apparatus 62 both remove fluid from the end-face 26 of dispenser 20 by bringing the discharge nozzle 24 into the travel path of film web 14.

Apparatus 10 and apparatus 62 may find beneficial use in any packaging application in which a dispenser dispenses fluid into a container, and wherein it is desired for such apparatus to automatically clean the discharge nozzle of the dispenser without the necessity of using a cleaning solvent. A preferred application for apparatus 10 or apparatus 62 is foam-in-place packaging as described hereinabove. For simplicity, such application will be described with reference to apparatus 10 as shown in FIGS. 1–5, but it is to be understood that the foregoing description applies equally to apparatus 62 as shown in FIG. 6.

When apparatus 10 is used for foam-in-place packaging applications, it is incorporated into a system that includes at least one web of film and at least one fluid source containing therein a fluid. An exemplary foam-in-place packaging system is shown in FIG. 1, wherein two film webs 14 and 18 are included as part of such system. Film webs 14 and 18 are preferably flexible, thermoplastic films, and may be formed from any polymeric material capable of being formed into a foam-in-bag cushion as described herein. Non-limiting examples include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies.

As described above, conveying and converting apparatus 12 conveys film webs 14, 18 along their respective paths of travel, converts them into containers 16, and then seals the containers closed after fluid is dispensed therein by dispenser 20. The operation and structure of suitable types of conveying and converting apparatus for foam-in-place packaging have been well described in the above-incorporated patents referenced in the background of the present specification, and will not be repeated herein except where otherwise necessary to illustrate particular aspects of the present invention. Exemplary foam-in-place packaging machines employing such conveying and converting apparatus are available from the assignee of this invention, Sealed Air Corporation of Saddle Brook, N.J., under the trademarks INSTAPACKER™, VERSAPACKER™, and SPEEDYPACKER™, among others.

As an alternative to using two separate webs of film to form containers as illustrated in the drawings, containers can be prepared from a center-folded film web, with the fold providing one of the longitudinal edges of the container and the dispenser being positioned within the center-folded web via the opposite longitudinal edge, which is initially open before being sealed closed downstream of the dispenser, such as is described in the above-incorporated U.S. Pat. No. 6,003,288. A further alternative is to prepare the container from a tube of plastic film material by sealing two transverse top and bottom edges. An additional alternative is to employ a film web carrying partially-formed containers that are converted into complete containers, e.g., by sealing closed the containers, after such containers are filled with fluid.

Containers 16 may be formed in any desired size and shape, e.g., as a bag, pouch, or other sealed enclosure of suitable dimensions for the intended packaging application.

For foam-in-place packaging, dispenser 20 is preferably adapted to dispense a fluid selected from polyols, isocyanates, and mixtures of polyols and isocyanates. In a preferred embodiment, one or more polyols may be supplied from a fluid source (not shown) to dispenser 20 via supply line 64, while one or more isocyanates may be supplied from a second fluid source (not shown) to dispenser 20 via supply line 66. Suitable fluid sources for the polyol(s) and isocyanate(s) may include a separate drum or other container for each chemical. The polyol(s) and isocyanate(s) flow through respective supply lines 64, 66 by action of separate pumps (not shown) that are in fluid communication with both the fluid source and supply lines 64, 66. Alternatively, the fluid sources may be positioned above dispenser 20 so that the polyol(s) and isocyanate(s) flow through the supply lines 64, 66 by force of gravity.

Dispenser 20 mixes the polyol(s) and isocyanate(s), both of which are in the fluid state, and dispenses the resultant mixture of fluids, indicated at 22, into container 16. As explained in the background section hereinabove, the polyol (s) and isocyanate(s) are foam precursors which, when mixed, produce a foamable composition that reacts to form a polyurethane foam. Polyurethane foam is thus produced in container 16. As the foam expands in container 16, the container may be placed in a mold to produce a packaging cushion having a predefined shape as disclosed, e.g., in commonly assigned U.S. Pat. No. 5,776,510. Alternatively, container 16 with the expanding fluid (foamable composition) 22 therein may be placed against a product to be packaged to form an individualized packaging cushion for such product.

Suitable dispensers of the type illustrated at 20 are well known and are disclosed, e.g., in commonly-assigned U.S. Pat. Nos. 4,898,327 and 5,255,847, the disclosures of which are hereby incorporated herein by reference. Other suitable dispensers, albeit in the form of a hand-held mixing gun, are disclosed in commonly-assigned U.S. Pat. Nos. 3,687,370, 3,945,569, and 4,426,023, the disclosures of which are also hereby incorporated herein by reference. When dispensers of this type are used, the residual fluid 30 that is removed from the end-face 26 by the present cleaning mechanism comprises at least one, and often a mixture of, the following: one or more polyols, one or more isocyanates, and one or more reaction-products of the polyol(s) and isocyanate(s), including polyurethane foam (depending, e.g., on the speed of the foaming reaction and the amount of time that elapses between when dispenser 20 ceases dispensing foamable fluid 22 into container 16 and when film web 14 is brought into contact with end-face 26).

As an alternative to a dispenser as described above that mixes the polyol(s) and isocyanate(s) before dispensing the resultant mixture into the container, a dispenser of the type disclosed in commonly-owned U.S. Pat. No. 5,727,370 may be used. The disclosure of U.S. Pat. No. 5,727,370 is hereby incorporated herein by reference. Such a dispenser as disclosed in the '370 patent injects the polyol(s) and isocyanate(s) into the container through separate discharge nozzles such that the two foam precursors do not begin to mix and form foam until after being introduced into the container. In order to avoid occlusion of such separate discharge nozzles, particularly the nozzle used to dispense the isocyanate because the isocyanate reacts with moisture in the air to crystallize at the discharge port of the nozzle, they may be cleaned in the same manner has herein described. That is, one or both discharge nozzles may be periodically brought into the travel path of the film web, simultaneously or separately, so that the film web can remove from the end-faces thereof at least a portion of any fluid, i.e., polyol, isocyanate, or reaction-products thereof (e.g., through crystallization or evaporation), that may be in adherence with such end-faces.

Accordingly, in employing apparatus 10 or 62 in a foam-in-place system in accordance with the present invention, a method for dispensing fluid into containers comprises the steps of:

a. providing film web 14, and optionally a second film web 18;

b. conveying film web 14 and second film web 18 along a predetermined path of travel and converting the film webs into one or more containers 16;

c. providing a fluid source (not shown) containing therein a fluid, e.g., a polyol (or an isocyanate) and, in the case of foam-in-place packaging, also providing a second fluid source (not shown) containing a second fluid comprising an isocyanate (or a polyol if the first named fluid is an isocyanate);

d. dispensing a predetermined amount of the fluid (or mixture thereof) as indicated at 22 into the containers 16 from dispenser 20, the dispenser being in fluid communication with the fluid source via supply line 64 (and with the second fluid source via supply line 66) and positioned adjacent the travel path of film web 14; and e. removing from the end-face 26 of discharge nozzle 24 of dispenser 20 at least a portion of any fluid 22 or reaction-products thereof, i.e., residual fluid 30, that may be in adherence with end-face 26 by bringing discharge nozzle 24 into the travel path of film web 14 so that the end-face 26 makes contact with film web 14, i.e., with surface 38 thereof.

Figure 7:
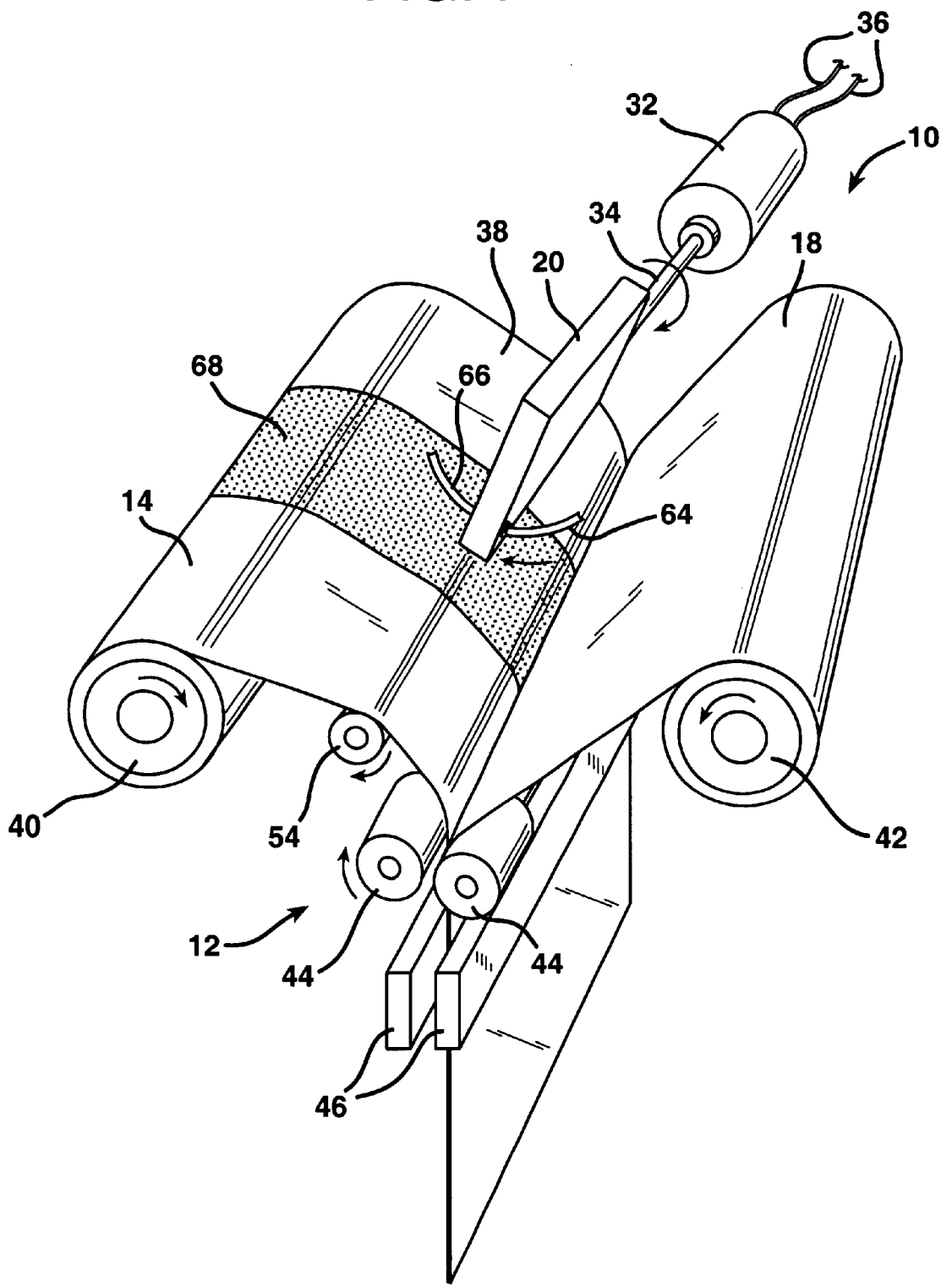
FIG. 7 is a perspective view similar to FIG. 4 illustrating a feature of the invention in which an abrasive material is attached to the end of the film roll and brought into contact with the dispenser in order to remove any hardened foam that has accumulated on the end-face of the dispenser.

Referring now to FIG. 7, a further feature of the cleaning mechanism of the present invention will be described. After the continued use of apparatus 10 (or 62) to make foam-in-place cushions, even after cleaning end-face 26 on film web 14 after each use of dispenser 20 as described above, it is possible that reaction-products of the dispensed fluid, e.g., polyurethane foam, will start to accumulate on the end-face 26 on and around the discharge port 28. In the event that this may occur, it may be advantageous for film web 14 to include one or more materials, designated at 68, that are incorporated into the film web or adhered to a surface 38 of the film web as a strip or otherwise ("cleaning materials"), that facilitate the removal of the fluid 22 or, more specifically, the reaction products of the fluid, such as polyurethane foam, crystallized isocyanate compound, etc., from end-face 26 of the discharge nozzle 24.

Alternatively, surface 38 of film web 14 may be modified at 68, e.g., by exposure to corona treatment, flame treatment, or plasma discharge treatment, to facilitate the removal of such fluid or reaction products thereof from end-face 26.

Such cleaning materials or modified surface 68 may conveniently be located at or near the end of film web 14. In this manner, just prior to removing depleted film webs 14, 18 from storage rolls 40, 42 for replacement with fresh film webs, apparatus 10 may assume the cleaning mode as shown in FIG. 7 (or apparatus 62 may assume the cleaning mode shown in FIG. 6) in order to bring the end-face 26 of dispenser 20 into contact with the strip of cleaning materials or modified surface indicated at 68 in order to remove from the end-face any accumulated polyurethane foam or other reaction-products or evaporation-residue that may have accumulated on end-face 26 during a previous period of repeated fluid dispensing cycles.

Suitable cleaning materials 68 that may be incorporated into film web 14 or adhered to surface 38 of the film web may comprise at least one material selected from:

a sheet or strip adhered to the film web surface 38 comprising an abrasive material, e.g., a strip of sandpaper as shown in FIG. 7, such as 100 grit aluminum oxide abrasive paper adhered to the film web surface with a pressure sensitive adhesive backing;

a coating on the film web surface 38 comprising an abrasive material;

a coating on the film web surface 38 comprising an adhesive material capable of pulling the precursors or reaction-products thereof from the end-face 26 of discharge nozzle 24, e.g., a urethane-based adhesive or various pressure sensitive adhesives;

a printed and textured pattern on the film web surface 38;

a material coated on film web surface 38 that is capable of transferring itself to end-face 26 to displace the precursors or reaction-products thereof and thereafter impede precursors or reaction-products thereof from adhering to the end-face, e.g., Teflon, wax, or grease;

a plurality of solid particles embedded in film web 14, wherein a portion of such particles extend from film web surface 38; and a plurality of microencapsulated reservoirs of a solvent that is capable of at least partially dissolving the precursors or reaction-products thereof, and which burst upon contact with end-face 26 to expose the end-face to such solvent.

Accordingly, a further aspect of the present invention is a film web 14 as shown in FIG. 7 that is conveyable along a predetermined path of travel, convertible into one or more containers 16, and capable of enclosing within the containers a polyurethane foam as at 22 that forms within the containers as the reaction-product of two or more foam precursors, the precursors being dispensed into the containers separately or as a mixture by at least one dispenser having a discharge nozzle through which the precursors flow into the containers, the discharge nozzle comprising an end-face and a discharge port disposed in the end-face, wherein the film web comprises one or more materials incorporated into the film web or adhered to a surface of the film web such that, when the film web is brought into contact with the end-face, at least a portion of any precursors or reaction-products thereof that may be in adherence with the end-face are removed therefrom.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An apparatus for dispensing fluid into containers, comprising:
  a. a mechanism that conveys a web of film along a predetermined path of travel and converts the film into one or more containers;
  b. a dispenser through which fluid may flow in predetermined amounts, said dispenser positioned adjacent the travel path of the film web such that said dispenser is capable of dispensing fluid into the containers, said dispenser having a discharge nozzle comprising an end-face and a discharge port disposed in said end-face, wherein fluid exits said dispenser through said discharge port; and
  c. a cleaning mechanism that brings said discharge nozzle of said dispenser into the travel path of the film web so that said end-face can make contact with the film web to remove from said end-face at least a portion of any fluid or reaction-products of the fluid that may be in adherence with said end-face.

2. The apparatus of claim 1, wherein said conveying and converting mechanism is adapted to seal the containers closed after fluid is dispensed therein by said dispenser.

3. The apparatus of claim 1, wherein said dispenser is adapted to dispense a fluid selected from polyols, isocyanates, and mixtures of polyols and isocyanates.

4. The apparatus of claim 1, wherein said cleaning mechanism includes a device for moving said dispenser from a first, dispensing position, in which said end-face of said discharge nozzle is adjacent the film web such that said dispenser can dispense fluid into the containers, to a second, cleaning position, in which said end-face is in contact with the film web.

5. The apparatus of claim 1, wherein said cleaning mechanism includes a device for moving the travel path of the film web from a first, dispensing position, in which said end-face of said discharge nozzle is adjacent the film web such that said dispenser can dispense fluid into the containers, to a second, cleaning position, in which the film web is in contact with said end-face.

6. The apparatus of claim 1, wherein said conveying and converting mechanism is adapted to advance the film web along the path of travel when said end-face of said discharge nozzle is in contact with the film web, thereby facilitating the removal of fluid or reaction-products of the fluid from said end-face.

7. The apparatus of claim 1, wherein said cleaning mechanism includes a support element having a position relative to said dispenser such that the travel path of the film web passes between said support element and said dispenser so that said discharge nozzle presses the film web against said support element when said end-face of said discharge nozzle is in contact with the film web.

8. The apparatus of claim 1, wherein said end-face of said discharge nozzle is substantially co-planar with or tangential to the film web when said end-face is in contact with the film web.

9. The apparatus of claim 1, wherein said cleaning mechanism is adapted to maintain said discharge nozzle in the travel path of the film web when said apparatus is idle.

10. A system for dispensing fluid into containers, comprising:
  a. a web of film;
  b. a mechanism that conveys said film web along a predetermined path of travel and converts said film web into one or more containers;
  c. a fluid source containing therein a fluid;
  d. a dispenser in fluid communication with said fluid source and being positioned adjacent the travel path of the film web to dispense a predetermined amount of said fluid into the containers, said dispenser having a discharge nozzle through which said fluid flows into the containers, said discharge nozzle comprising an end-face and a discharge port disposed in said end-face, said fluid exiting said dispenser through said discharge port; and
  e. a cleaning mechanism that brings said discharge nozzle of said dispenser into the travel path of said film web so that said end-face makes contact with said film web to remove from said end-face at least a portion of any fluid or reaction-products of said fluid that may be in adherence with said end-face.

11. The system of claim 10, wherein said conveying and converting mechanism seals the containers closed after said fluid is dispensed therein by said dispenser.

12. The system of claim 10, wherein said fluid is selected from polyols, isocyanates, and mixtures of polyols and isocyanates.

13. The system of claim 12, wherein:
said fluid comprises one or more polyols;
said dispenser is in fluid communication with a second fluid source containing therein one or more isocyanates; and
said dispenser mixes the polyols and isocyanates and dispenses the mixture into said containers.

14. The system of claim 10, wherein said cleaning mechanism includes a device for moving said dispenser from a first, dispensing position, in which said end-face of said discharge nozzle is adjacent said film web and said dispenser dispenses fluid into the containers, to a second, cleaning position, in which said end-face is in contact with said film web.

15. The system of claim 10, wherein said cleaning mechanism includes a device for moving the travel path of said film web from a first, dispensing position, in which said end-face of said discharge nozzle is adjacent said film web and said dispenser dispenses fluid into the containers, to a second, cleaning position, in which said film web is in contact with said end-face.

16. The system of claim 10, wherein said conveying and converting mechanism advances said film web along the path of travel when said end-face of said discharge nozzle is in contact with said film web, thereby facilitating the removal of fluid or reaction-products of said fluid from said end-face.

17. The system of claim 10, wherein said cleaning mechanism includes a support element having a position relative to said dispenser such that the travel path of said film web passes between said support element and said dispenser so that said end-face of said discharge nozzle presses said film web against said support element when said end-face is in contact with said film web.

18. The system of claim 10, wherein said film web includes one or more materials incorporated into the film web or adhered to a surface of the film web that facilitate the removal of said fluid or reaction products of said fluid from said end-face of said discharge nozzle.

19. The system of claim 10, wherein a surface of said film web is modified to facilitate the removal of said fluid or reaction products of said fluid from said discharge nozzle.

20. The system of claim 10, wherein said end-face of said discharge nozzle is substantially co-planar with or tangential to said film web when said end-face is in contact with said film web.

21. The system of claim 10, wherein said cleaning mechanism maintains the end-face of said discharge nozzle in contact with said film web when said system is idle.

22. A method for dispensing fluid into containers, comprising:
  a. providing a web of film;
  b. conveying said film web along a predetermined path of travel and converting said film web into one or more containers;
  c. providing a fluid source containing therein a fluid;
  d. dispensing a predetermined amount of said fluid into the containers from a dispenser that is in fluid communication with said fluid source and is positioned adjacent the travel path of the film web, said dispenser having a discharge nozzle through which said fluid flows into the containers, said discharge nozzle comprising an end-face and a discharge port disposed in said end-face, said fluid exiting said dispenser through said discharge port; and
  e. removing from said end-face at least a portion of any fluid or reaction-products of said fluid that may be in adherence with said endface by bringing said discharge nozzle of said dispenser into the travel path of said film web so that said end-face makes contact with said film web.

23. The method of claim 22, further comprising the step of sealing the containers closed after said fluid is dispensed therein by said dispenser.

24. The method of claim 22, wherein said fluid is selected from polyols, isocyanates, and mixtures of polyols and isocyanates.

25. The method of claim 24, wherein:
said fluid comprises a polyol;
said dispenser is in fluid communication with a second fluid source containing therein an isocyanate; and
said dispenser mixes the polyol and isocyanate and dispenses the mixture into the containers.

26. The method of claim 22, wherein said step of removing fluid from said end-face includes moving said dispenser from a first, dispensing position, in which said end-face of said discharge nozzle is adjacent said film web and said dispenser dispenses fluid into the containers, to a second, cleaning position, in which said end-face is in contact with said film web.

27. The method of claim 22, wherein said step of removing fluid from said end-face includes moving the travel path of said film web from a first, dispensing position, in which said end-face of said discharge nozzle is adjacent said film web and said dispenser dispenses fluid into the containers, to a second, cleaning position, in which said film web is in contact with said end-face.

28. The method of claim 22, wherein said step of removing fluid from said end-face includes advancing said film web along the path of travel when said end-face of said discharge nozzle is in contact with said film web.

29. The method of claim 22, wherein said step of removing fluid from said end-face includes passing said film web between said dispenser and a support element so said end-face of said discharge nozzle presses said film web against said support element when said end-face is in contact with said film web.

30. The method of claim 22, wherein said film web includes one or more materials incorporated into the film web or adhered to a surface of the film web that facilitate the removal of said fluid or reaction products of said fluid from said end-face of said discharge nozzle.

31. The method of claim 22, wherein a surface of said film web is modified to facilitate the removal of said fluid or reaction products of said fluid from said end-face of said discharge nozzle.

32. The method of claim 22, wherein said end-face of said discharge nozzle is substantially co-planar with or tangential to said film web when said end-face is in contact with said film web.

33. A film web that is conveyable along a predetermined path of travel, convertible into one or more containers, and capable of enclosing within the containers a polyurethane foam that forms within the containers as the reaction-product of two or more foam precursors, the precursors being dispensed into the containers separately or as a mixture by at least one dispenser having a discharge nozzle through which the precursors flow into the containers, the discharge nozzle comprising an end-face and a discharge port disposed in the end-face, said film web comprising one or more materials incorporated into said film web or adhered to a surface of said film web such that, when said film web is brought into contact with the end-face, at least a portion of any precursors or reaction-products thereof that may be in adherence with the end-face are removed therefrom.

34. The film web of claim 33, wherein said one or more materials incorporated into said film web or adhered to a surface of said film web comprise at least one material selected from
  a sheet or strip adhered to said film web surface comprising an abrasive material;
  a coating on said film web surface comprising an abrasive material;
  a coating on said film web surface comprising an adhesive material capable of pulling the precursors or reaction-products thereof from the end-face of the discharge nozzle;
  a printed and textured pattern on said film web surface;
  a material coated on said film web surface that is capable of transferring to the end-face to displace the precursors or reaction-products thereof and thereafter impedes precursors or reaction-products thereof from adhering to the end-face;
  a plurality of solid particles, a portion of said particles extending from said film web surface; and
  a plurality of microencapsulated reservoirs of a solvent that is capable of at least partially dissolving the precursors or reaction-products thereof.

35. The film web of claim 33, wherein said two or more foam precursors comprise at least one isocyanate and at least one polyol.

* * * * *